United States Patent [19]

McCowin et al.

[11] Patent Number: 4,886,442

[45] Date of Patent: Dec. 12, 1989

[54] VACUUM BAG TOOLING APPARATUS WITH INFLATABLE SEAL

[75] Inventors: Peter D. McCowin, Enumclaw; Paul E. Nelson, Tacoma, both of Wash.

[73] Assignee: The Boeing Company, Seattle, Wash.

[21] Appl. No.: 199,004

[22] Filed: May 26, 1988

[51] Int. Cl.$^4$ .................. B32B 35/00; B32B 31/20
[52] U.S. Cl. ..................... 425/388; 425/389; 425/405.1; 425/DIG. 19; 425/DIG. 60; 156/285; 156/382
[58] Field of Search ............ 156/286, 285, 382, 583.3, 156/104; 264/316, 102, 101; 425/388, 389, DIG. 19, DIG. 60, 504, 405.1

[56] References Cited

U.S. PATENT DOCUMENTS

| | | | |
|---|---|---|---|
| 2,510,417 | 6/1950 | Rehklau | 22/13 |
| 2,815,549 | 12/1957 | Olson | 22/10 |
| 2,876,492 | 3/1959 | Frieder et al. | 18/5 |
| 3,040,393 | 6/1962 | Dailey | 20/69 |
| 3,074,129 | 1/1963 | Peterson | 22/13 |
| 3,102,309 | 9/1963 | Peterson | 22/13 |
| 3,146,143 | 7/1969 | Bolesky et al. | 156/382 |
| 3,491,825 | 1/1970 | Peterson et al. | 277/34 X |
| 3,535,740 | 10/1970 | Frowde | 18/19 |
| 4,143,852 | 3/1979 | Wiener | 249/135 |
| 4,305,773 | 12/1981 | Hendricks | 156/382 |
| 4,396,451 | 8/1983 | Yeager | 156/285 |
| 4,732,639 | 3/1988 | Newsom | 156/382 |

FOREIGN PATENT DOCUMENTS

| | | | |
|---|---|---|---|
| 265609 | 10/1968 | Austria . | |
| 448070 | 4/1948 | Canada . | |
| 0023053 | 1/1981 | European Pat. Off. | 156/382 |
| 1815040 | 6/1970 | Fed. Rep. of Germany . | |
| 7318528 | 12/1974 | France . | |

*Primary Examiner*—Michael W. Ball
*Assistant Examiner*—Michele K. Yoder
*Attorney, Agent, or Firm*—Bruce A. Kaser

[57] ABSTRACT

An apparatus for forming composite members has a frame assembly which is lowered onto a table. A sheet of vacuum bagging material, supported by the frame, covers a tooling surface on the table. Attached to the sheet is a downwardly depending seal which continuously extends around the sheet's periphery. This seal inserts into an upwardly opening channel that surrounds the perimeter of the table's tooling surface as the frame is lowered. The seal is inflated while in the channel and this provides in airtight seal between the sheet and tooling surface.

8 Claims, 4 Drawing Sheets

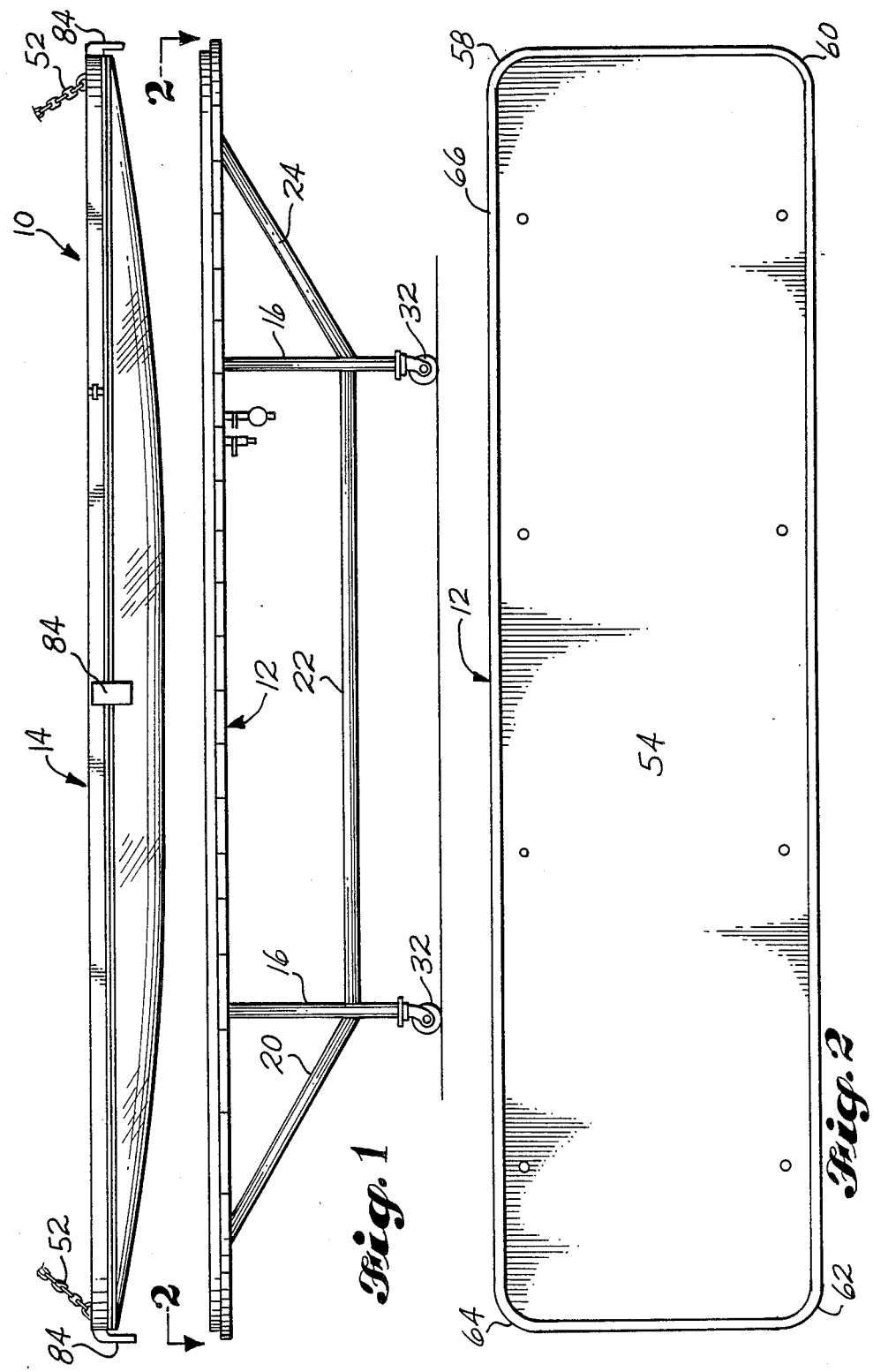

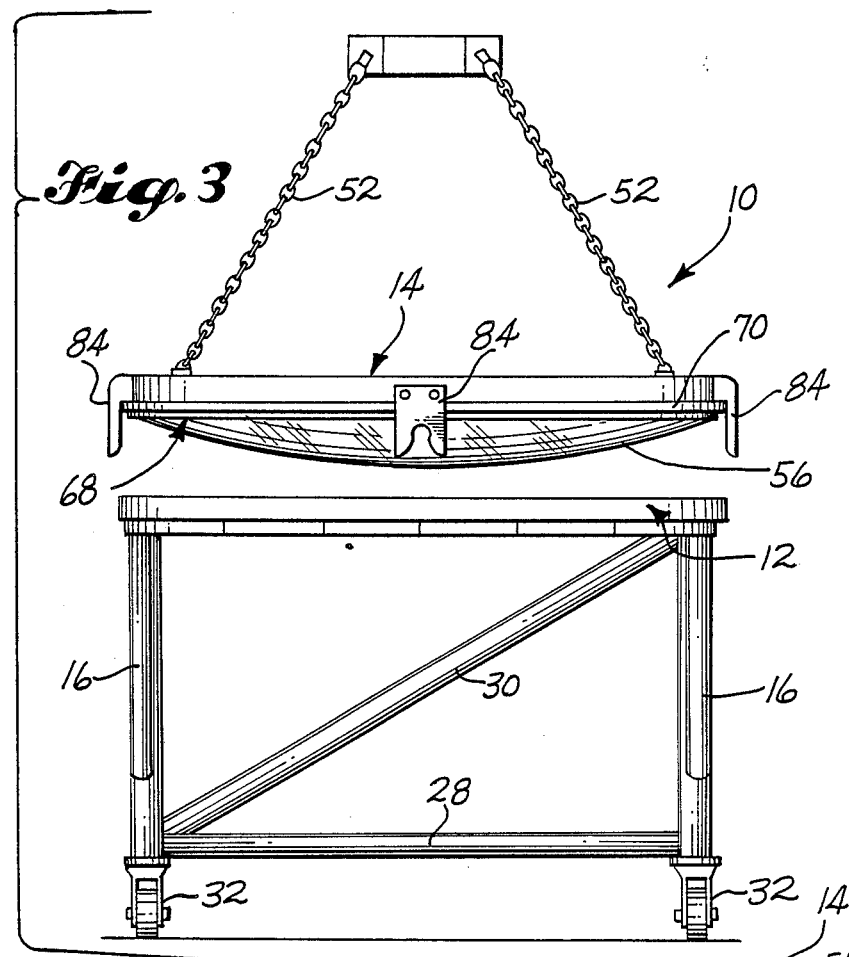
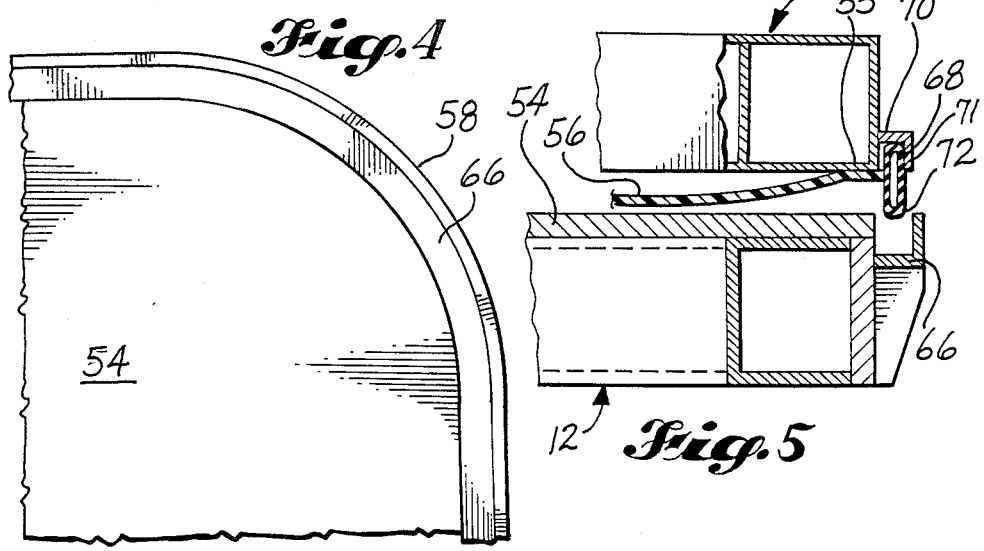

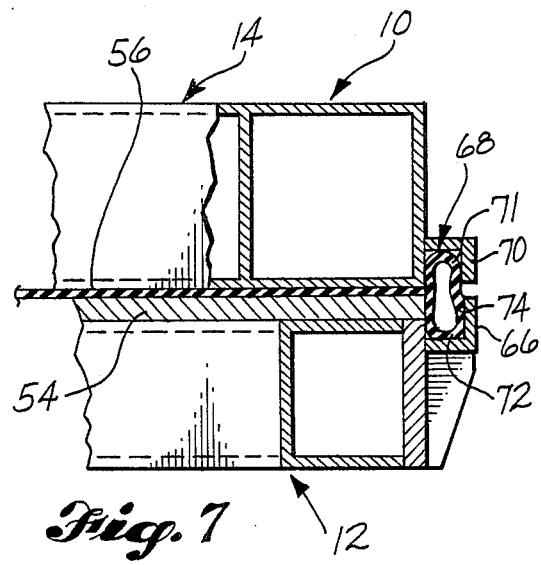
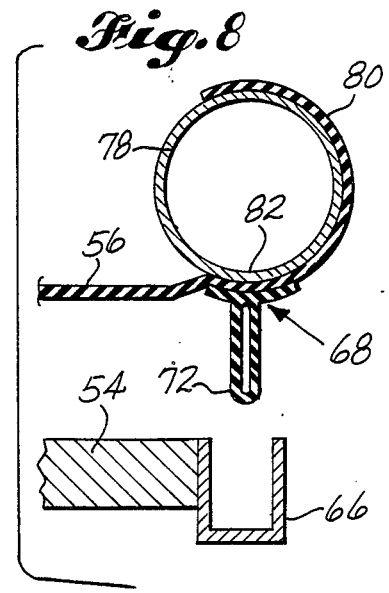
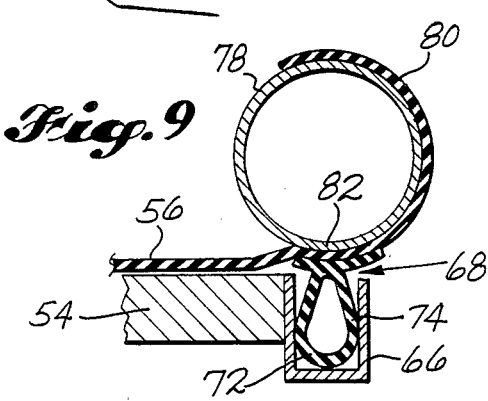
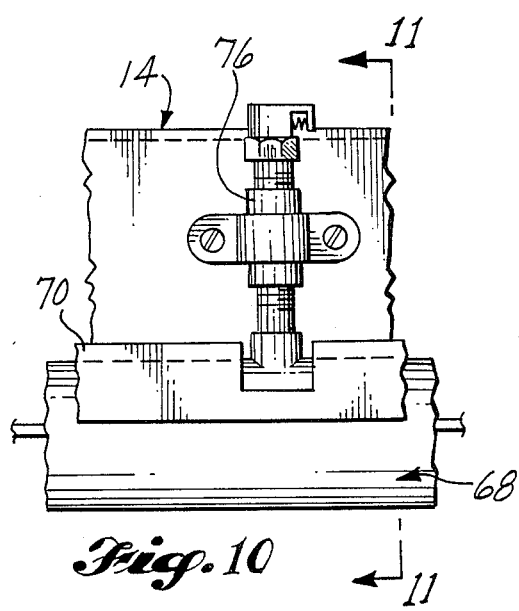
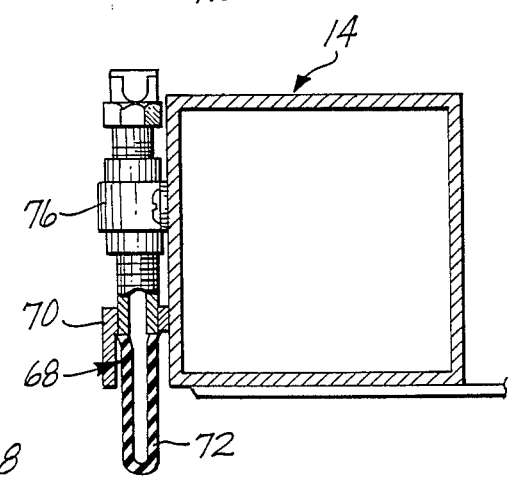

VACUUM BAG TOOLING APPARATUS WITH INFLATABLE SEAL

DESCRIPTION

TECHNICAL FIELD

This invention relates to certain kinds of tooling which utilize vacuum bagging techniques for shaping and forming parts made of composite materials. More particularly, it relates to seals used in conjunction with such tooling for maintaining a vacuum between a caul plate and a sheet of vacuum bagging material.

BACKGROUND ART

Certain kinds of vacuum bag tooling employ large tooling surfaces upon which composite materials are placed and covered by a sheet of airtight bagging material. The sheet is sealed to the tooling surface around the outer boundary of the composite, thus providing an airtight space in which the composite is received. As would be familiar to a person skilled in the art, this space is evacuated which causes air pressure acting on the sheet's outer surface to force both the sheet and composite against the tooling surface, after which the composite is cured.

One method of sealing the sheet is to use a triangular pyramid sell made of silicon which is bonded to and protrudes upwardly from the tooling surface. Unfortunately, this type of seal is known to be easily damaged during part layup and removal. For example, shop personnel placing uncured composite materials onto the tooling surface and removing cured parts thereafter must exercise great care in avoiding composite contact with the seal. Carelessness in doing this can quickly damage the seal necessitating its repair or replacement. In an automated production environment this means costly down time. Still further, on large tooling surfaces the sheet must be momentarily held down on the seal prior to evacuation in order to ensure good seal engagement with the sheet. This can be time consuming and is also undesirable in an automated environment. As will become apparent, the present invention provides an improvement over these drawbacks.

DISCLOSURE OF THE INVENTION

The present invention is an improved apparatus for forming composite members or parts. It has a table portion that includes a caul plate tooling surface, and a frame assembly portion that is mountable to the table. The frame is mounted by lowering it directly onto the table. Connected across the bottom of the frame is a sheet of airtight vacuum bagging material whose area is at least as great as the area of the table's tooling surface. This sheet covers the tooling surface as the frame is lowered. Bonded to the sheet is an elastomeric seal which has a downwardly depending portion that is inflatable. The table has an upwardly opening channel which continuously extends around the perimeter of its tooling surface, and the seal's downwardly depending portion is positioned and shaped for insertion into such channel when the frame is lowered. The seal is deflated during this procedure but afterward is inflated which causes its outer walls to expand tightly against the channel's interior walls. This provides a substantially airtight seal completely around the tooling surface, and between the surface and the bagging material. Of course, a composite material or materials would be placed in the space created therebetween, which is subsequently evacuated during formation of the composite part.

An advantage to the present invention is that it eliminates the use of an upwardly protruding silicon seal on the same surface as the tooling surface. This provides a clear area on the surface for shop personnel to quickly place and remove composite materials without worrying about causing seal damage. A further advantage is that it uses a seal that is removed from the table by the same frame which supports the vacuum bagging material. This lends itself more easily to an automated manufacturing process. Still another advantage is that its seal provides a positive sealing action which reduces air leakage during evacuation. These advantages, and others, will become more readily apparent upon consideration of the drawings in conjunction with the description that follows.

BRIEF DESCRIPTION OF THE DRAWINGS

In the drawings, like reference numerals refer to like parts throughout the various views, and wherein:

FIG. 1 is a side elevational view of an improved apparatus for forming composite members or parts constructed in accordance with a preferred embodiment of the invention, and shows a frame assembly portion of the apparatus being lowered onto a caul plate or table portion;

FIG. 2 is a top plan view of the table shown in FIG. 1, and is taken along line 2—2 in FIG. 1;

FIG. 3 is an end elevational view of the apparatus shown in FIG. 1;

FIG. 4 is an enlarged fragmentary top plan view of one corner of the table shown in FIG. 2;

FIG. 5 is an enlarged, fragmentary cross-sectional view of a side portion of both the frame and table shown in FIGS. 1 and 3, and shows how the frame is mounted by lowering it onto the table, and further shows an elastomeric seal connected to a sheet of vacuum bagging material that is suspended from the frame;

FIG. 7 is a view like FIG. 5, but shows the frame placed on top of the table and shows inflation of the elastomeric seal;

FIG. 8 is a view like FIG. 5, but of another embodiment of the invention;

FIG. 9 is a view like FIG. 7, but is directed to the embodiment shown in FIG. 8;

FIG. 10 is a side elevational view of a vacuum fitting and shows its connection to the seal shown in FIGS. 5 and 7; and FIG. 11 is a cross-sectional view of the fitting, and seal shown in FIG. 10, and is taken along line 10—10 in FIG. 10.

BEST MODE FOR CARRYING OUT THE INVENTION

Figure 6:
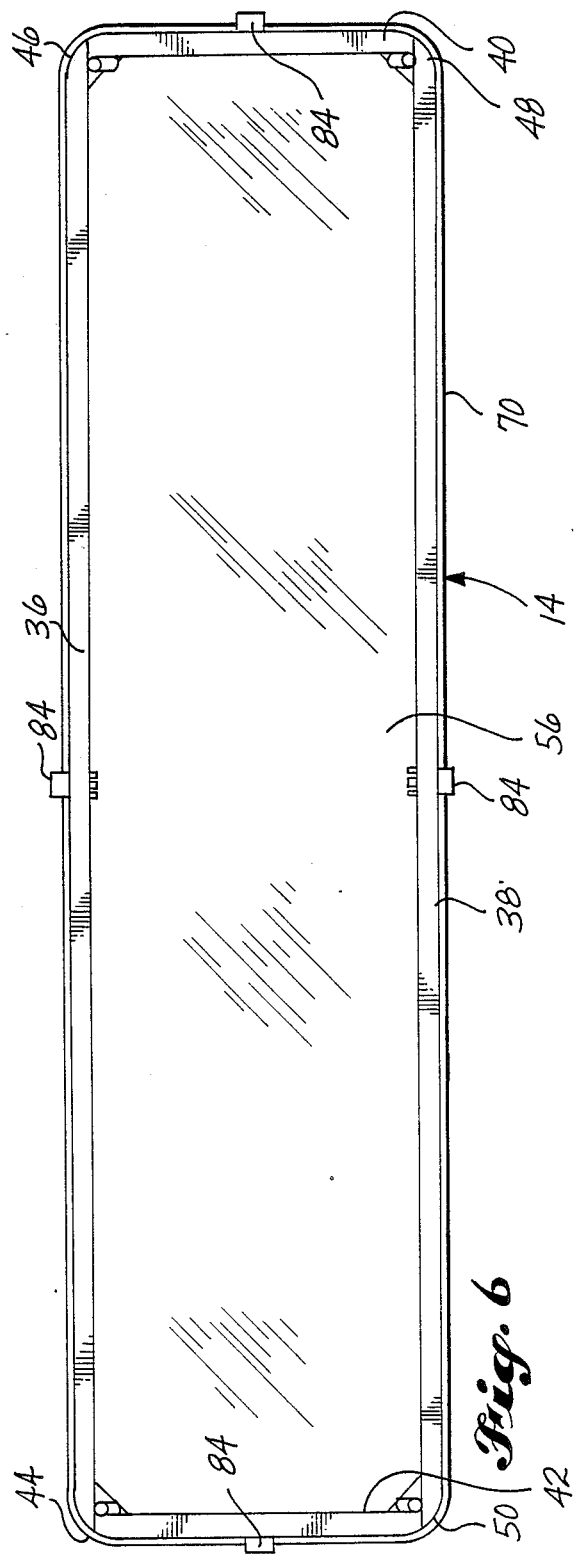
FIG. 6 is a top plan view of the frame shown in FIGS. 1 and 3.

Referring now to the drawings, and first to FIG. 1, therein is shown at 10 an apparatus for forming composite members or parts constructed in accordance with the invention. The apparatus 10 includes a table portion 12 and a frame assembly portion 14. The table 12 is supported by four vertical legs 16, the back two of which cannot be seen in FIG. 1, and conventionally known braces 20, 22, 24. In FIG. 3, one of the back legs 16 is shown along with transverse supporting braces 28, 30. Each leg may have a caster wheel 32 for permitting the table to be moved easily.

Directing attention to FIG. 6, the frame 14, which is placed on top of the table 12 during a composite-forming operation, is made of four tubular members 36, 38, 40, 42 connected together in the general shape of a rectangle, but having rounded corners 44, 46, 48, 50. During normal operation of the apparatus 10 the frame 14 is hoisted overhead by chains 52 and is lowered onto the table's top or tooling surface 54 (see FIGS. 1 and 2).

A sheet of a suitable airtight vacuum bagging material 56, hereinafter a "vacuum sheet", is draped below and across the frame 14. Preferably, the area of this sheet is greater than the area of the table's tooling surface 54. The sheet 56 is connected or bonded directly to the frame's tubular members 36, 38, 40, 42 by a conventional adhesive substance. This is best seen at 55 in FIG. 5.

Preferably, the table's perimeter is approximately the same size as the frame's perimeter, and it also has rounded corners 58, 60, 62, 64 which generally correspond to the shape of the frame's corners 44, 46, 48, 50. Just outside the perimeter of the tooling surface 54 is an upwardly opening channel 66 that extends continuously around the tooling surface. This channel 66 is shown in FIGS. 1, 4, 5 and 7-9 as being attached to the outside of tooling surface 54, although it should be appreciated the channel 66 could be machined directly into the tooling surface if desired.

The channel 66 receives a downwardly depending elastomeric seal 68 that is connected around the periphery of the vacuum sheet 56. Directing attention to FIG. 7, preferably this seal 68 is bonded by an adhesive directly to the sheet 56. It is received or held in a downwardly-directed channel 70 that is directly attached to and extends around the frame's perimeter in much the same fashion as upward channel 66 is connected to the table 12. The seal 68 is made of an elastically inflatable silicon rubber.

Normally, when the frame 14 is lowered onto the table 12, the seal is in a deflated condition as shown in FIG. 5. An upper portion 71 of the seal is held in downward channel 70 and lower portion 72 extends downwardly below this channel. The lower portion 72 when in a deflated condition is insertible into upward channel 66 of the table and engages in male/female fitment therewith. After this is done, the seal 68 is inflated which causes its outer walls 74 to expand tightly against the interior walls of both channels 66 and 70. Expansion against the walls of channel 66 causes a positive airtight seal to be placed around the perimeter of both tooling surface 54 and vacuum sheet 56, thus creating an airtight space between them.

The seal 68 may be inflated by any suitable means such as a conventional air fitting 76 which is shown in FIGS. 10 and 11. As a person skilled in the art would realize, the fitting 76 would be connected to a source of pressurized air controlled by a three-way valve. This would permit both the supply and removal of pressurized air to and from the seal 68 for, respectively, seal inflation and deflation.

In FIGS. 5 and 7, the tubular members 36, 38, 40, 42 making up the frame 14 are shown to be generally square in cross section. An alternative embodiment is shown in FIGS. 8 and 9 where these members have been replaced by a circular tube 78. In this embodiment, the vacuum sheet 56 extends partially around and is bonded to the outer circumference of tube 78, as is shown at 80. The inflatable seal 68 is suitably bonded to the sheet 56 at or near the tube's lower portion 82. In this embodiment, substantially all of the seal is received in upward channel 66.

As previously mentioned, when the apparatus 10 is in use, the frame 14 is lowered onto the table 12. Before this is done, a pre-plied composite is first placed on the table's tooling surface 54. The frame 14 may have downwardly extending guides 84 attached to various locations around the frame. These guides 84 extend over the channel 70, as is shown in FIG. 3, and provide a means for registering the frame 14 with respect to the table 12 as it is lowered. When the frame 14 is lowered, the seal 68 is in a deflated condition and easily inserts into the table's channel 66. Then, the seal is inflated and the space between the vacuum sheet 56 and tooling surface 54 is evacuated by known methods for composite forming. Thereafter, the seal 68 is deflated and the frame 14 is removed by lifting it off the table so that the formed part can be removed.

It is to be understood the above description sets forth the best mode currently known for carrying out the invention. As such, it should be appreciated that certain changes could be made in the invention as described above without departing from its spirit and scope. None of the preceding description should be taken as limiting, and it should be further understood the scope of any patent rights due to the patentee are to be limited only by the patent claim or claims which follow, wherein interpretation thereof is to be made in accordance with the established doctrines of patent claim interpretation.

What is claimed is:

1. An apparatus for forming composite members, comprising:
    a table portion having a tooling surface and an upwardly opening channel, said channel extending continuously around outside the perimeter of said surface;
    a frame portion mountable to said table portion by lowering it onto said table portion, said frame portion including a sheet of airtight vacuum bagging material, said sheet covering said tooling surface when said frame portion is lowered onto said table portion; and an elastomeric seal connected to said frame portion adjacent the periphery of said sheet, said seal including a continuous downwardly depending portion that is inflatable, wherein when said inflatable portion is in a deflated condition said inflatable portion is shaped and positioned for male/female fitment into said channel as said frame portion is lowered onto said table portion, and further, said inflatable portion being inflatable after such fitment is made, in a manner so as to cause said inflatable portion's outer walls to expand horizontally outwardly against the interior walls of said channel, to provide a substantially airtight seal around said tooling surface and between said surface and said sheet of vacuum bagging material.

2. The apparatus of claim 1, wherein said upwardly opening channel defines the outside perimeter of said table portion, and wherein the outside perimeter of said frame portion has substantially the same shape as said table portion's outside perimeter, said frame portion's outside perimeter being defined by a continuous downwardly opening channel, said downwardly opening channel facing said upwardly opening channel of said table portion when said frame portion is lowered onto said table portion, and wherein an upper portion of said seal is received in said downwardly opening channel of said frame portion, and a lower portion of said seal extends downwardly below said downwardly opening channel, both said upper and lower seal portions being inflatable, wherein said lower portion is positioned and shaped for male/female insertion into said table portion channel when said lower portion is in a deflated condition and when said frame portion is lowered onto said table portion, and further, said upper and lower seal portions being horizontally inflatable after said frame portion is so lowered, in a manner so as to cause the outer walls of said seal's upper and lower portions to expand, respectively, horizontally outwardly against the interior walls of both said frame portion and table portion channels.

3. The apparatus of claim 2, including means connected to said frame portion for guiding said frame portion onto said table portion, and for bringing said downwardly opening channel of said frame portion into facing registration with said upwardly opening channel of said table portion.

4. The apparatus of claim 2, wherein said sheet is bonded to said frame portion adjacent the outer perimeter of said frame portion.

5. The apparatus of claim 1, wherein said seal is bonded directly to said sheet.

6. The apparatus of claim 1, wherein said sheet and said seal are both made of silicon rubber.

7. The apparatus of claim 1, wherein said sheet is larger than the area of said tooling surface.

8. The apparatus of claim 1, wherein said frame portion includes at least one cylindrical tubular member, with a peripheral edge of said sheet extending at least partially around the outside of said tubular member, and said seal is bonded directly to said sheet adjacent the bottom of said tubular member.

* * * * *